United States Patent
Jang et al.

(10) Patent No.: US 10,531,444 B2
(45) Date of Patent: Jan. 7, 2020

(54) METHOD AND APPARATUS OF OPERATING MULTIPLE TIME ALIGNMENT TIMERS IN MOBILE COMMUNICATION SYSTEM SUPPORTING CARRIER AGGREGATION

(75) Inventors: Jaehyuk Jang, Suwon-si (KR); Kyeong In Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/440,216

(22) Filed: Apr. 5, 2012

(65) Prior Publication Data

US 2012/0257570 A1    Oct. 11, 2012

Related U.S. Application Data

(60) Provisional application No. 61/471,872, filed on Apr. 5, 2011.

(30) Foreign Application Priority Data

Apr. 3, 2012   (KR) .......................... 10-2012-0034308

(51) Int. Cl.
*H04W 4/00*       (2018.01)
*H04W 72/04*     (2009.01)
(Continued)

(52) U.S. Cl.
CPC ......... *H04W 72/042* (2013.01); *H04L 1/1835* (2013.01); *H04L 1/1851* (2013.01);
(Continued)

(58) Field of Classification Search
None
See application file for complete search history.

(56) References Cited

U.S. PATENT DOCUMENTS 8,243,672 B2   8/2012 Park et al.
8,867,440 B2   10/2014 Ho et al.
(Continued)

FOREIGN PATENT DOCUMENTS

CN   101310546 A   11/2008
CN   101646234 A   2/2010
(Continued)

OTHER PUBLICATIONS

E-MAIL Rapporteur (NTT Docomo, Inc.), CA support for multi-TA, 3GPP TSG-RAN2#69, R2-101567, Feb. 18, 2010, Sections 1 and 2, San Francisco, USA.
(Continued)

*Primary Examiner* — Steve R Young
(74) *Attorney, Agent, or Firm* — Jefferson IP Law, LLP

(57) ABSTRACT

A method of operating multiple time alignment timers (TimeAlignmentTimer) is provided for facilitating communication between and evolved Node B (eNB) and a User Equipment (UE) in a Long Term Evolution (LTE) system supporting multiple carriers. The method includes starting a first TAT of a first group including the primary cell, starting a second TAT when Timing Advance (TA) information on a second group not including the primary cell is received; and determining transmission of at least one of a Hybrid Automatic Repeat Request Acknowledgement/Negative-acknowledgement (HARQ ACK/NACK), a physical uplink control channel, and a sounding reference signal according to a start and an expiration of at least one of the first and second TATs.

20 Claims, 12 Drawing Sheets

US 10,531,444 B2
Page 2

(51) Int. Cl.

| | | |
|---|---|---|
| *H04W 76/19* | (2018.01) | |
| *H04L 1/18* | (2006.01) | |
| *H04L 5/00* | (2006.01) | |
| *H04W 56/00* | (2009.01) | |
| *H04W 52/02* | (2009.01) | |
| *H04W 52/36* | (2009.01) | |
| *H04W 52/50* | (2009.01) | |
| *H04W 74/08* | (2009.01) | |
| *H04W 74/00* | (2009.01) | |
| *H04W 28/04* | (2009.01) | |
| *H04W 76/38* | (2018.01) | |
| *H04L 27/26* | (2006.01) | |
| *H04W 48/08* | (2009.01) | |
| *H04W 88/08* | (2009.01) | |
| *H04W 72/00* | (2009.01) | |
| *H04W 84/04* | (2009.01) | |
| *H04W 24/04* | (2009.01) | |

(52) U.S. Cl.
CPC .......... *H04L 1/1854* (2013.01); *H04L 1/1874* (2013.01); *H04L 1/1883* (2013.01); *H04L 5/001* (2013.01); *H04L 5/0048* (2013.01); *H04L 5/0098* (2013.01); *H04W 28/04* (2013.01); *H04W 52/0216* (2013.01); *H04W 52/0219* (2013.01); *H04W 52/367* (2013.01); *H04W 52/50* (2013.01); *H04W 56/001* (2013.01); *H04W 56/0005* (2013.01); *H04W 56/005* (2013.01); *H04W 56/0015* (2013.01); *H04W 56/0045* (2013.01); *H04W 72/0413* (2013.01); *H04W 72/0446* (2013.01); *H04W 74/006* (2013.01); *H04W 74/085* (2013.01); *H04W 74/0833* (2013.01); *H04W 74/0858* (2013.01); *H04W 74/0891* (2013.01); *H04W 76/19* (2018.02); *H04L 27/2662* (2013.01); *H04W 24/04* (2013.01); *H04W 48/08* (2013.01); *H04W 72/00* (2013.01); *H04W 72/04* (2013.01); *H04W 72/0453* (2013.01); *H04W 76/38* (2018.02); *H04W 84/042* (2013.01); *H04W 88/08* (2013.01); *Y02D 70/1242* (2018.01); *Y02D 70/1262* (2018.01); *Y02D 70/1264* (2018.01); *Y02D 70/14* (2018.01); *Y02D 70/23* (2018.01); *Y02D 70/24* (2018.01)

(56) References Cited

U.S. PATENT DOCUMENTS

| | | | |
|---|---|---|---|
| 9,084,270 B2* | 7/2015 | Dinan ................. | H04W 56/001 |
| 9,307,498 B2 | 4/2016 | Baldemair et al. | |
| 9,794,900 B2* | 10/2017 | Wu .................... | H04W 56/0005 |
| 9,949,221 B2* | 4/2018 | Yamada ................ | H04W 48/20 |
| 2009/0176500 A1 | 7/2009 | Panico et al. | |
| 2009/0191910 A1 | 7/2009 | Athalye et al. | |
| 2009/0201868 A1 | 8/2009 | Chun et al. | |
| 2009/0232107 A1 | 9/2009 | Park et al. | |
| 2009/0245191 A1 | 10/2009 | Ball et al. | |
| 2009/0259910 A1 | 10/2009 | Lee et al. | |
| 2010/0074202 A1* | 3/2010 | Park et al. ..................... | 370/329 |
| 2010/0103873 A1 | 4/2010 | Buracchini | |
| 2010/0118720 A1 | 5/2010 | Gauvreau et al. | |
| 2010/0158147 A1 | 6/2010 | Zhang et al. | |
| 2010/0159919 A1 | 6/2010 | Wu | |
| 2010/0177747 A1 | 7/2010 | Chun et al. | |
| 2010/0240372 A1 | 9/2010 | Wu | |
| 2010/0254351 A1 | 10/2010 | Wang et al. | |
| 2010/0273515 A1 | 10/2010 | Fabien et al. | |
| 2010/0296454 A1* | 11/2010 | Park ...................... | H04L 1/1812 370/328 |
| 2010/0296467 A1 | 11/2010 | Pelletier et al. | |
| 2011/0158116 A1 | 6/2011 | Tenny et al. | |
| 2011/0158117 A1 | 6/2011 | Ho et al. | |
| 2011/0243102 A1* | 10/2011 | Sebire ............... | H04W 56/0045 370/336 |
| 2011/0249635 A1 | 10/2011 | Chen et al. | |
| 2011/0287776 A1 | 11/2011 | Vujcic | |
| 2012/0069788 A1 | 3/2012 | Shen et al. | |
| 2012/0250520 A1 | 10/2012 | Chen et al. | |
| 2012/0307821 A1 | 12/2012 | Kwon et al. | |
| 2013/0021984 A1 | 1/2013 | Han et al. | |
| 2013/0121203 A1 | 5/2013 | Jung et al. | |
| 2013/0272279 A1* | 10/2013 | Dinan ............... | H04W 56/0005 370/336 |
| 2014/0162642 A1* | 6/2014 | Kwon ..................... | H04W 8/24 455/435.1 |
| 2016/0081045 A1 | 3/2016 | Bostrom et al. | |

FOREIGN PATENT DOCUMENTS

| | | |
|---|---|---|
| CN | 201550284 U | 8/2010 |
| CN | 101841905 A | 9/2010 |
| CN | 101873713 A | 10/2010 |
| CN | 101933281 A | 12/2010 |
| CN | 101946425 A | 1/2011 |
| CN | 101998646 A | 3/2011 |
| CN | 102204386 A | 9/2011 |
| CN | 103119996 A | 5/2013 |
| CN | 103141041 A | 6/2013 |
| EP | 2 214 448 A1 | 8/2010 |
| EP | 2 230 872 A1 | 9/2010 |
| EP | 2 375 848 A1 | 10/2011 |
| EP | 2 536 227 A2 | 12/2012 |
| JP | 2011-508559 A | 3/2011 |
| JP | 2012-531121 A | 12/2012 |
| JP | 2013-533673 A | 8/2013 |
| JP | 2014-506059 A | 3/2014 |
| KR | 10-2009-0076805 A | 7/2009 |
| KR | 10-2009-0078866 A | 7/2009 |
| KR | 10-2009-0101796 A | 9/2009 |
| KR | 10-0917832 B1 | 9/2009 |
| KR | 10-2010-0126704 A | 12/2010 |
| WO | 2009/096745 A2 | 8/2009 |
| WO | 2009/154412 A2 | 12/2009 |
| WO | 2010/065759 A2 | 6/2010 |
| WO | 2010/074504 A2 | 7/2010 |
| WO | 2010/107354 A1 | 9/2010 |
| WO | 2010/121708 A1 | 10/2010 |
| WO | 2010/124228 A2 | 10/2010 |
| WO | 2010/127520 A1 | 11/2010 |
| WO | 2010/148404 A1 | 12/2010 |
| WO | 2011/002789 A1 | 1/2011 |
| WO | 2011/019256 A2 | 2/2011 |
| WO | 2012/108643 A2 | 8/2012 |
| WO | 2012/130173 A1 | 10/2012 |

OTHER PUBLICATIONS

ITRI, Time Alignment Timer for different TA, 3GPP TSG RAN WG2 #68 bis, R2-100560, Jan. 12, 2010, Section 2, Valencia, Spain.
Interdigital Communications, Release of PUCCH resources and removal of SCell Configuration, 3GPP TSG RAN WG2 #71, R2-104814, Aug. 17, 2010, Section 22, Madrid, Spain.
Interdigital Communications, TAT Operation in LTE 11 CA, 3GPP TSG RAN WG2 #75, R2-114265, Aug. 16, 2011, Section 2, Athens, Greece.
ZTE, Discussion on Multiple TA, 3GPP TSG RAN WG2 #73, R2-111908, Apr. 4, 2011, Section 2, Shanghai, China.
Interdigital, UE Actions at TAT Expiration with LTE CA, 3GPP TSG RAN WG2 #70, R2-103774, Jun. 22, 2010, Section 2, Stockholm, Sweden.
Catt et al, TAT expiry in CA, 3GPP TSG RAN WG2 #71, R2-104508, Aug. 17, 2010, Section 2.3, Madrid, Spain.
CCL/ITRI, Random Access Transmission with Priority in E-UTRA Uplink, 3GPP TSG RAN WG1 LTE Ad Hoc Meeting, R1-060140, XP050417569, Jan. 23-25, 2006, Helsinki, Finland.

(56) References Cited

OTHER PUBLICATIONS

Ericsson et al., Adding a Power Management indication in PHR, 3GPP TSG-RAN2 Meeting #73, R2-111601, Feb. 24, 2011, Taipei, Taiwan.
Mediatek Inc., Rel-10 PHR for non-CA UE, 3GPP TSG-RAN WG2 Meeting #72bis, R2-110244, Jan. 11, 2011, Dublin, Ireland.
Qualcomm Incorporated, Power Management Based PHR Trigger, 3GPP TSG-RAN2 Meeting #72bis, R2-110177, Jan. 11, 2011, Dublin, Ireland.
Qualcomm Incorporate, Definition of Pcmax,c, 3GPP TSG RAN4 #57AH, R4-110567, Jan. 26, 2011 Austin, Texas, USA.
Alcatel-Lucent et al., Introduction of new PHR trigger to indicate the configured maximum UE power variation, 3GPP TSG-RAN2 Meeting #72, R2-106896, Nov. 19, 2010, Jacksonville, USA.
Fujitsu; Clarifications on PHR; 3GPP TSG-RAN WG2 Meeting #72bis; R2-110214; Jan. 17-21, 2011; Dublin, Ireland.
Ericsson et al.; 3GPP TSG-RAN2 Meeting #72bis; R2-110664; Jan. 17-21, 2011; Dublin, Ireland.
Ericsson et al: "Timing Advance Maintenance for SCells", 3GPP Draft; R2-121558, XP050606352; Jeju, South Korea; Mar. 26, 2012.
Ericsson et al., Adding a Power Management Indication in PHR, 3GPP TSG-RAN2 Meeting #73, Feb. 14, 2011, R2-110940, XP050605646, Taipei, Taiwan.
3GPP, 3rd Generation Partnership Project, Technical Specification Group Radio Access Network, Evolved Universal Terrestrial Radio Access (E-UTRA), Medium Access Control (MAC) Protocol Specification (Release 10), 3GPP TS 36.321, Dec. 2010, V10.0.0, XP050462124, Sophia Antipolis, Cedex, France.
3GPP, Technical Specification Group Radio Access Network, Evolved Universal Terrestrial Radio Access (E-UTRA), Medium Access Control (MAC) Protocol Specification (Release 10), 3GPP TS 36.321, Mar. 2011, V10.1.0, Sophia Antipolis, France.
3GPP, 3rd Generation Partnership Project, Technical Specification Group Radio Access Network, Evolved Universal Terrestrial Radio Access (E-UTRA), Radio Resource Control (RRC) Protocol Specification (Release 10), 3GPP TS 36.331 Dec. 2010, V10.0.0, Sophia Antipolis, France.
Ericsson et al., "Power Management Indication in PHR", 3GPP TSG-RAN WG2#73, Tdoc R2-110941, Feb. 21-25, 2011, Taipei, Taiwan.
Interdigital, "PHR Triggering for SAR", 3GPP TSG RAN WG2 #72-bis, R2-110220, Jan. 17-21, 2011, Dublin, Ireland.
Qualcomm Inc., "PHR Trigger for Power Reduction Due to Power Management", 3GPP TSG-RAN2 Meeting #73, R2-110797, Feb. 21-25, 2011, Taipei, Taiwan.
ZTE,Consideration on SCell RLM in Carrier Aggregation, 3GPP TSG-RAN WG4 meeting AH#4, R4-103527, China, Oct. 11-15, 2010.
ETSI, Physical Layer Procedures, 3GPP TS 36.213 V 10.0.1, Release 10, 2011.
ZTE, Impact Analysis of Multiple TA, 3GPP TSG RAN WG2 #68 bis, R2-100308, Valencia, Spain, Jan. 18-22, 2010.
InterDigital Communications, Timing of SCell Activation in LTE CA, 3GPP TSG-RAN WG2 #72bis, R2-110216, Dublin, Ireland, Jan. 17-21, 2011.
Panasonic, UL Activation and Details of MAC CE for CC Management, 3GPP TSG-RAN WG2 Meeting #70bis, R2-103605, STockholm, Sweden, Jun. 28, 2010 through Jul. 2, 2010.
Indian Office Action dated Aug. 31, 2018; Application #: 2437/KOLNP/2013.
Indian Office Action dated Sep. 3, 2018; Application #: 2534/KOLNP/2013.
Korean Office Action dated Nov. 1, 2018; Application #: 10-2012-0015361.
Korean Office Action dated Aug. 31, 2018; Application #: 10-2012-0035228.
Korean Office Action dated Sep. 17, 2018; Application #: 10-2012-0035238.
Korean Office Action dated Nov. 9, 2018; Application #: 10-2012-0035573.
Korean Office Action dated Nov. 9, 2018; Application #: 10-2012-0034308.
Qualcomm Incorporated; Supporting multiple timing advance groups; 3GPP TSG-RAN WG2 meeting#68bis; R2-100423; Jan. 18-22, 2010; Valencia, Spain.
Samsung; Main issues in supporting multi-TAs; 3GPP TSG RAN WG2#73BIS; R2-112305; Apr. 11-15, 2011; Shanghai, China.
3GPP; 3rd Generation Partnership Project; Technical Specification Group Radio Access Network; Evolved Universal Terrestrial Radio Access (E-UTRA); Medium Access Control (MAC) protocol specification (Release 9); 3GPP TS 36.321; V9.3.0; Jun. 2010.
3GPP; 3rd Generation Partnership Project; Technical Specification Group Radio Access Network; Evolved Universal Terrestrial Radio Access (E-UTRA); Radio Resource Control (RRC); Protocol specification (Release 9); 3GPP TS 36.331; V9.3.0; Jun. 2010.
NTT Docomo; Further discussions on LTE-A UE categories/ capabilities; 3GPP TSG-RAN WG4 Ad-hoc meeting #2010-04; R4-103847; Oct. 11-15, 2010; Xi'An, China.
Nokia Siemens Networks et al.; UE capability signalling for CA and MIMO in REL10; 3GPP TSG-RAN WG2 Meeting #72; R2-106892; Nov. 15-19, 2010; Jacksonville, FL.
Korean Office Action with English translation dated Nov. 30, 2018; Korean Appln. No. 10-2012-0035517.
European Search Report dated Nov. 30, 2018; European Appln. No. 18202243.4-1214.
European Search Report dated Dec. 21, 2018; European Appln. No. 18202354.9-1214.
Indian Office Action dated Dec. 26, 2018; Indian Appln. No. 2137/KOLNP/2013.
Potevio et al., Corrections to Extended PHR, 3GPP TSG-RAN WG2 Meeting #73B, R2-111878, ShangHai, China, Apr. 11-15, 2011.
3GPP TS 36.321 V10.0.0, 3rd Generation Partnership Project, Technical Specification Group Radio Access Network, Evolved Universal Terrestrial Radio Access (E-UTRA), Medium Access Control (MAC) protocol specification, (Release 10), Dec. 2010.
Qualcomm Incorporated, "Supporting multiple timing advance groups", 3GPP Draft, R2-100423 Supporting Multiple Timing Advance Groups, Mobile Competence Centre; 650, Route Des Lucioles, F-06921 Sophia-Antipolis Cedex; France, Version RAN WG2, Jan. 12, 2010.
Qualcomm Incorporated, "PHR Trigger for Power Reduction Due to Power Management", 3GPP TSG-RAN2, Meeting #73, R2-110797, Feb. 14, 2011.
Qualcomm Incorporated, "Definition of Pcmax,c", 3GPP TSG RAN4 #57AH, R4-110567, Jan. 26, 2010.
European Office Action dated Mar. 22, 2019, issued in European Patent Application No. 12 747 557.2.
Indian Office Action dated Apr. 15, 2019, issued in Indian Patent Application No. 2864/KOLNP/2013.
Korean Office Action dated Apr. 18, 2019, issued in Korean Patent Application No. 10-2019-0013441.
Indian Office Action dated May 17, 2019, issued in Indian Patent Application No. 2863/KOLNP/2013.
Alcatel-Lucent et al., R2-112210, SCell configuration for multiple TA, 3GPP TSG RAN WG2 #73bis, 3GPP, Apr. 11-15, 2011, Shanghai, China.
Alcatel-Lucent Shanghai Bell et al., R2-102372, Discussion on TA timer for LTE-A CA scenario, 3GPP, Apr. 12-16, 2010, Beijing, China.
Samsung, R2-105401, Discussion on TAT expiry, 3GPP TSG RAN WG2 #71bis, Oct. 11-15, 2010, Xian, China.
Alcatel-Lucent et al., R2-112208, DL reference & the need of TA grouping for multiple TA, 3GPP TSG RAN WG2 #73bis, Apr. 11-15, 2011, Shanghai, China.
Korean Office Action dated Jul. 18, 2019, issued in Korean Patent Application No. 10-2012-0035573.
Korean Office Action dated Sep. 18, 2019, issued in Korean Patent Application No. 10-2019-0074183.
Chinese Office Action dated Aug. 5, 2019, issued in Chinese Patent Application No. 201611001840.5.

(56) References Cited

OTHER PUBLICATIONS

Chinese Office Action dated Sep. 3, 2019, issued in Chinese Patent Application No. 201610886019.X.
Chinese Office Action dated Sep. 25, 2019, issued in Chinese Patent Application No. 201710086512.8.
Indian Search Report dated Oct. 14, 2019, issued in Indian Patent Application No. 2870/KOLNP/2013.
European Search Report dated Nov. 4, 2019, issued in European Patent Application No. 19196752.0.

* cited by examiner

METHOD AND APPARATUS OF OPERATING MULTIPLE TIME ALIGNMENT TIMERS IN MOBILE COMMUNICATION SYSTEM SUPPORTING CARRIER AGGREGATION

PRIORITY

This application claims the benefit under 35 U.S.C. § 119(e) of a U.S. Provisional application filed on Apr. 5, 2011 in the U.S. Patent and Trademark Office and assigned Ser. No. 61/471,872, and claims the benefit under 35 U.S.C. § 119(a) of a patent application filed in the Korean Intellectual Property Office on Apr. 3, 2012, and assigned Serial No. 10-2012-0034308, the entire disclosures of each of which are hereby incorporated by reference.

BACKGROUND OF THE INVENTION

1. Field of the Invention

The present invention relates to a radio communication system. More particularly, the present invention relates to a method of operating multiple time alignment timers in a Long Term Evolution (LTE) system using multiple carriers.

2. Description of the Related Art

With the rapid advance of radio communication technology, mobile communication systems have highly evolved. Long Term Evolution (LTE) is one of the promising 4th generation mobile communication technologies. In an LTE system, various techniques are adopted to meet the explosively increasing traffic demands. Carrier aggregation is one such technique. Carrier aggregation is used to flexibly expand available bandwidth by aggregating multiple secondary carriers with a primary carrier, unlike the legacy LTE system using a single carrier, between a User Equipment (UE) and an evolved Node B (eNB). In LTE, the primary carrier is referred to as Primary Cell (PCell) and the secondary carrier as Secondary Cell (SCell).

When the locations of the eNB apparatuses using the primary and secondary carriers are different from each other due to the deployment of repeaters and Remote Radio Head, it may be necessary to change the uplink transmission timing. For example, when the eNB apparatus operating with the primary carrier and another eNB apparatus operating with the secondary carrier are located at different places, it may cause a problem in transmission timing according to the location of the UE since the uplink signal to the eNB apparatus located at a further distance should be transmitted earlier than the signal to the other eNB apparatus. In this case, i.e., if there are multiple uplink timings, there is a need for managing the uplink timings efficiently.

When the locations of the eNB apparatuses using the primary and secondary carriers are different from each other due to the deployment of repeaters and Remote Radio Head, it may be necessary to change the uplink transmission timing. For example, when the eNB apparatus operating with the primary carrier and another eNB apparatus operating with the secondary carrier are located at different places, it may cause a problem in transmission timing according to the location of the UE since the uplink signal to the eNB apparatus located at a further distance should be transmitted earlier than the signal to the other eNB apparatus. In this case, i.e., if there are multiple uplink timings, there is a need for managing the uplink timings efficiently.

SUMMARY OF THE INVENTION

Aspects of the present invention are to address at least the above-mentioned problems and/or disadvantages and to provide at least the advantages described below. Accordingly, an aspect of the present invention is to provide a method for operating multiple time alignment timers for managing a plurality of uplink timings in a wireless mobile communication system supporting carrier aggregation.

Another aspect of the present invention is to provide a method for operating multiple alignment timers that is capable of improving communication reliability by categorizing carriers having the same uplink timings into groups and signaling the time alignment timer value per group separately.

Still another aspect of the present invention is to provide a method for operating multiple alignment timers that is capable of optimizing system performance by handling the transmission timings according to the time alignment timer expiration depending on whether the carriers managed by the time alignment timer include a Primary Cell (PCell).

In accordance with an aspect of the present invention, a method for operating Timing Advance Timers (TATs) of a terminal in a wireless communication system operating with a primary cell and at least one secondary cell based on a carrier aggregation technique is provided. The method includes starting a first TAT of a first group including the primary cell, starting a second TAT when Timing Advance (TA) information on a second group not including the primary cell is received, and determining transmission of at least one of a Hybrid Automatic Repeat Request Acknowledgement/Negative-acknowledgement (HARQ ACK/NACK), a physical uplink control channel, and a sounding reference signal according to a start and an expiration of at least one of the first and second TATs.

In accordance with another aspect of the present invention, a terminal operating TATs in a wireless communication system operating with a primary cell and at least one secondary cell based on a carrier aggregation technique is provided. The terminal includes a transceiver for communicating a signal or data with a base station, and a controller for starting a first TAT of a first group including the primary cell, for starting a second TAT when TA information on a second group not including the primary cell is received, and for determining transmission of at least one of a HARQ ACK/NACK, a physical uplink control channel, and a sounding reference signal according to a start and an expiration of at least one of the first and second TATs.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
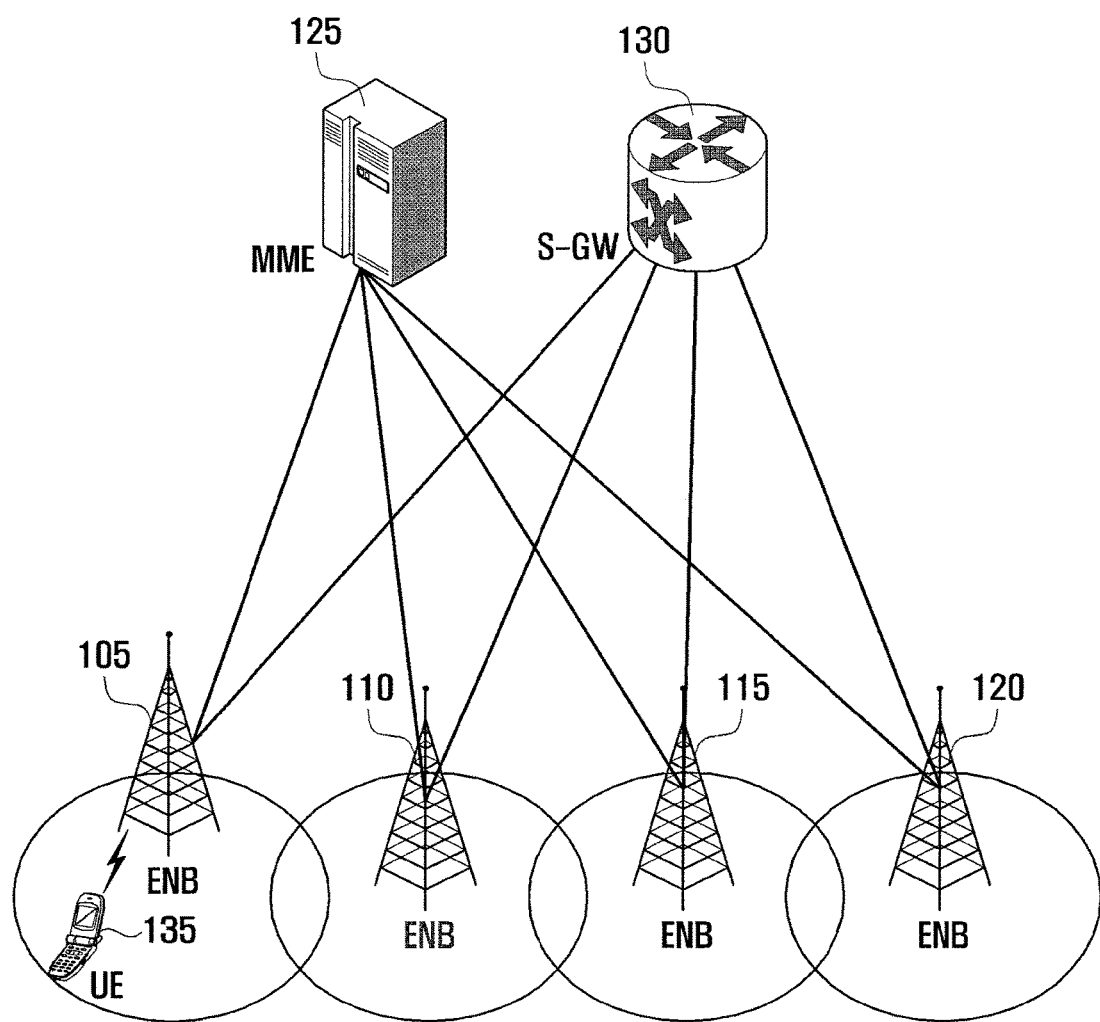
FIG. 1 is a diagram illustrating an architecture of a Long Term Evolution (LTE) system according to an exemplary embodiment of the present invention.

FIG. 1 is a diagram illustrating the architecture of a Long Term Evolution (LTE) system according to an exemplary embodiment of the present invention.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The User Equipment (UE) 135 connects to an external network via eNBs 105, 110, 115, and 120 and the S-GW 130.

In FIG. 1, the eNBs 105, 110, 115, and 120 correspond to legacy node Bs of Universal Mobile Communications System (UMTS). The eNBs 105, 110, 115, and 120 allow the UE to establish a radio link and are responsible for more complicated functions as compared to the legacy node B. In the LTE system, all the user traffic including real time services such as Voice over Internet Protocol (VoIP) are provided through a shared channel and thus there is a need for a device which is located in the eNB to schedule data based on the state information such as UE buffer conditions, power headroom state, and channel state.

Typically, one eNB controls a plurality of cells. In order to secure the data rate of up to 100 Mbps, the LTE system adopts Orthogonal Frequency Division Multiplexing (OFDM) as a radio access technology. The LTE system adopts Adaptive Modulation and Coding (AMC) to determine the modulation scheme and channel coding rate in adaptation to the channel condition of the UE. S-GW 130 is an entity to provide data bearers so as to establish and release data bearers under the control of the MME 125. MME 125 is responsible for various control functions and is connected to a plurality of eNBs 105, 110, 115, and 120.

Figure 2:
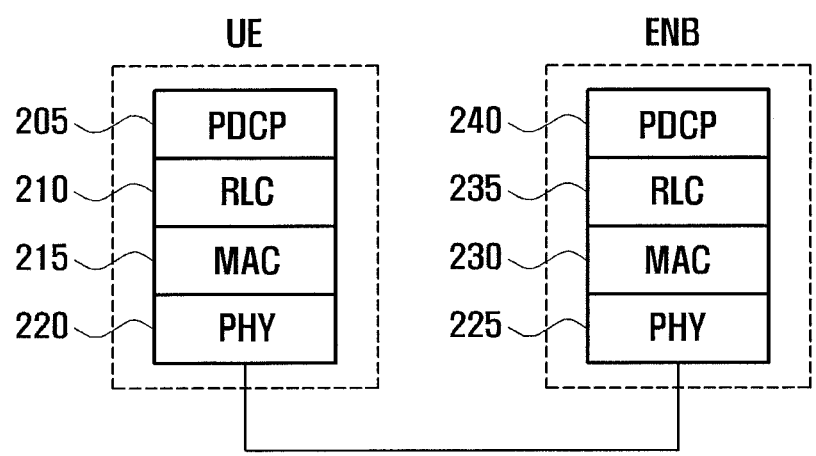
FIG. 2 is a diagram illustrating a protocol stack of an LTE system according to an exemplary embodiment of the present invention.

FIG. 2 is a diagram illustrating a protocol stack of an LTE system according to an exemplary embodiment of the present invention.

Referring to FIG. 2, the protocol stack of the LTE system, as employed at a UE and an eNB, includes a Packet Data Convergence Protocol (PDCP) layer 205 and 240, a Radio Link Control (RLC) layer 210 and 235, a Medium Access Control (MAC) layer 215 and 230, and a Physical (PHY) layer 220 and 225. The PDCP layer 205 and 240 is responsible for Internet Protocol (IP) header compression/decompression, and the RLC layer 210 and 235 is responsible for segmenting the PDCP Protocol Data Unit (PDU) into segments in appropriate size for Automatic Repeat Request (ARQ) operation. The MAC layer 215 and 230 is responsible for establishing connection to a plurality of RLC entities so as to multiplex the RLC PDUs into MAC PDUs and demultiplex the MAC PDUs into RLC PDUs.

The PHY layer 220 and 225 performs channel coding on the MAC PDU and modulates the MAC PDU into OFDM symbols to transmit over a radio channel or performs demodulating and channel-decoding on the received OFDM symbols and delivers the decoded data to the higher layer. The PHY layer uses Hybrid ARQ (HARQ) for additional error correction by transmitting 1 bit information indicating for positive or negative acknowledgement from the receiver to the transmitter. This is referred to as HARQ ACK/NACK information. The downlink HARQ ACK/NACK information corresponding to an uplink transmission is transmitted through Physical Hybrid-ARQ Indicator Channel (PHICH), and the uplink HARQ ACK/NACK information corresponding to a downlink transmission may be transmitted through Physical Uplink Control Channel (PUCCH) or Physical Uplink Shared Channel (PUSCH).

Figure 3:
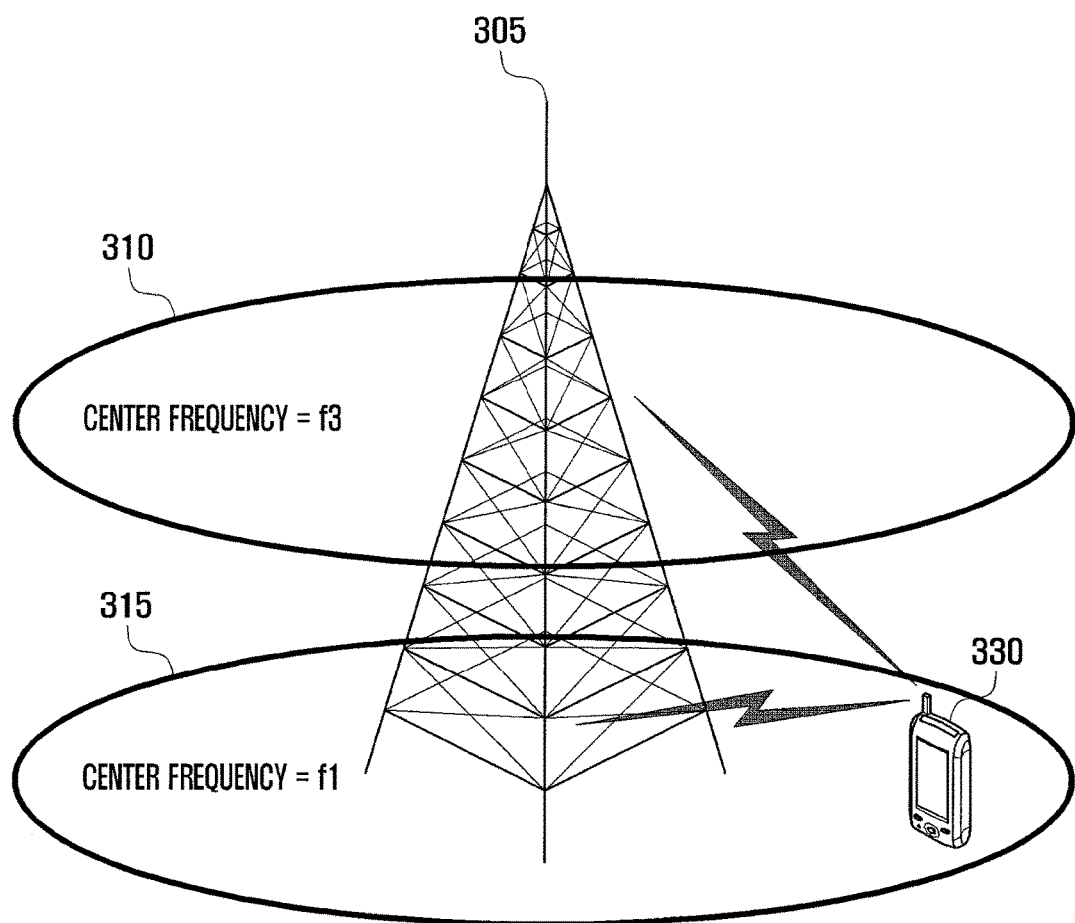
FIG. 3 is a diagram illustrating an exemplary situation of carrier aggregation in an LTE system according to an exemplary embodiment of the present invention.

FIG. 3 is a diagram illustrating an exemplary situation of carrier aggregation in an LTE system according to an exemplary embodiment of the present invention.

Referring to FIG. 3, an eNB may typically use multiple carriers transmitted and received in different frequency bands. For example, the eNB 305 may be configured to use the carrier 315 with center frequency f1 and the carrier 310 with center frequency f3. If carrier aggregation is not supported, the UE 330 transmits/receives data using one of the carriers 310 and 315. However, the UE 330 having the carrier aggregation capability may transmit/receive data using both the carriers 310 and 315. The eNB may increase the amount of the resource to be allocated to the UE having the carrier aggregation capability in adaptation to the channel condition of the UE so as to improve the data rate of the UE.

By taking notice that a cell is configured with one downlink carrier and one uplink carrier in the related art, the carrier aggregation may be understood as if the UE communicates data via multiple cells. With the use of carrier aggregation, the maximum data rate increases in proportion to the number of aggregated carriers.

In the following description, the phrase "the UE receives data through a certain downlink carrier or transmits data through a certain uplink carrier" denotes transmitting or receiving data through control and data channels provided in a cell corresponding to center frequencies and frequency bands of the downlink and uplink carriers. Although the description is directed to an LTE mobile communication system for convenience of explanation, exemplary embodiments of the present invention may be applied to other types of wireless communication systems supporting carrier aggregation.

Figure 4:
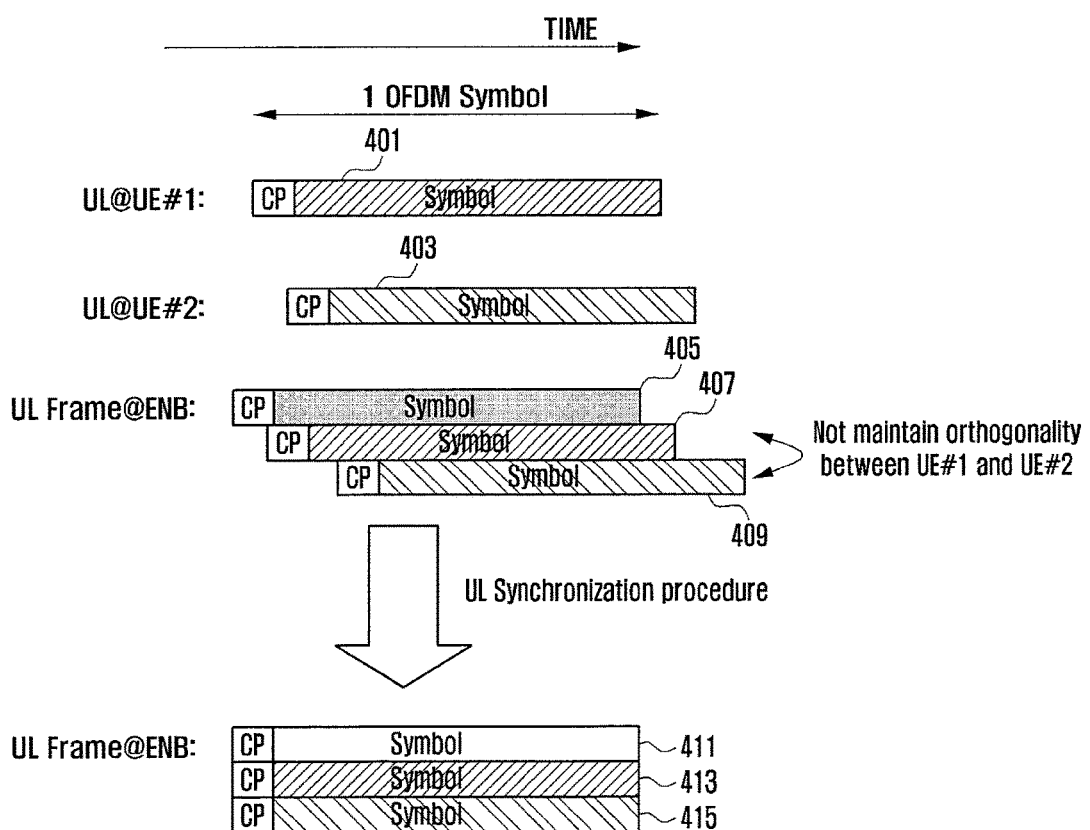
FIG. 4 is a diagram illustrating a principle of uplink timing synchronization in an Orthogonal Frequency Division Multiplexing (OFDM)-based 3$^{rd}$ Generation Partnership Project (3GPP) LTE system according to an exemplary embodiment of the present invention.

FIG. 4 is a diagram illustrating a principle of uplink timing synchronization in an Orthogonal Frequency Division Multiplexing (OFDM)-based $3^{rd}$ Generation Partnership Project (3GPP) LTE system according to an exemplary embodiment of the present invention.

Referring to FIG. 4, the diagram is directed to an exemplary case where the UE#1 is located near the eNB while the UE#2 is located far from the eNB. In FIG. 4, T_pro1 indicates the first propagation delay time to the UE#1, and T_pro2 indicates the second propagation delay to the UE#2. As shown in FIG. 4, the UE#1 is closer to the eNB than the UE#2 and thus has a relatively short propagation delay (T_pro1 is 0.333 us, T_pro2 is 3.33 us).

When the UE#1 and UE#2 power on or operate in idle mode within a cell of the eNB, the uplink timing of the UE#1, uplink timing of the UE#2, and uplink timings of other UEs detected by the eNB in the cell may fail in synchronization.

Reference number 401 denotes uplink OFDM symbol transmission timing of the UE#1, and reference number 403 denotes uplink OFDM symbol transmission timing of the UE#2. By taking notice of the uplink transmission propagation delays of the UE#1 and UE#2, the eNB may receive the uplink OFDM symbols at the timings denoted by reference numbers 405, 407, and 409. The UE#1's uplink symbol transmitted at the timing 401 is received by the eNB at the timing 407 with propagation delay while the UE#2's uplink symbol transmitted at the timing 403 is received by the eNB at the timing 409 with propagation delay. In FIG. 4, since the timings 407 and 409 are before the synchronization is acquired between the uplink transmission timings of the UE#1 and UE#2, the uplink OFDM symbol reception and decoding start timing 405 of the eNB, the UE#1's uplink OFDM symbol reception timing 407, and the UE#2's uplink OFDM symbol reception timing 409 are different.

In this case, the uplink symbols transmitted by the UE#1 and UE#2 have no orthogonality, and thus interfere with each other. As a consequence, the eNB is likely to fail decoding the uplink symbols transmitted at the timing 401 and 403 by the UE#1 and UE#2, due to the interference and the mismatch between the uplink symbol reception timings 407 and 409.

Uplink timing synchronization is a procedure for acquiring the eNB's uplink symbol reception timings with the UE#1 and UE#2. If the uplink timing synchronization procedure completes, it is possible to acquire the synchronization among the eNB's uplink OFDM symbol reception and decoding start timing, UE#1's uplink OFDM symbol reception timing, and UE#2's uplink OFDM symbol reception timing as denoted by reference numbers 411, 413, and 415.

In the uplink timing synchronization procedure, the eNB transmits Timing Advance (TA) information to the UEs to notify of the timing adjustment amount.

The eNB may transmit the TA information in the Timing Advance Commence MAC Control Element (TAC MAC CE) or in the Random Access Response (RAR) message in response to the random access preamble transmitted by the UE for initial access.

If the TA information is received, the UE starts a time alignment timer (timeAlignmentTimer or TAT). The TAT is a timer for verifying the validity of the TA. The TA is valid before the expiration of the TAT, and the validity of the TA is not guaranteed after the expiration of the TAT.

If the additional TA information is received afterward, the TAT restarts and, if the TAT expires, it is regarded that the TA information received from the eNB after the expiration of the TAT is invalid so as to set the uplink communication with the eNB.

By acquiring the synchronization among the transmission timings as described above, it is possible to maintain the orthogonality between the uplink symbols of the UE#1 and UE#2 such that the eNB may decode the uplink symbols from the UE#1 and UE#2 at the timings 401 and 403 successfully.

Figure 5:
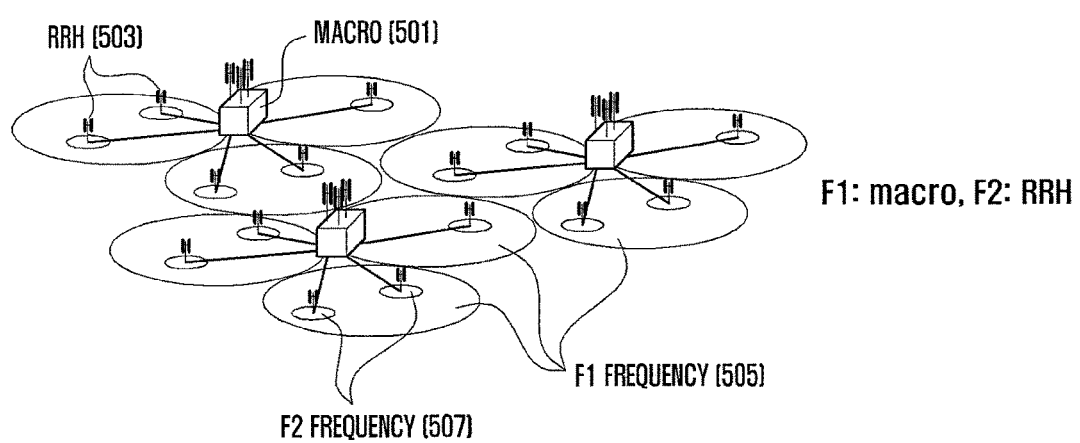
FIG. 5 is a diagram illustrating an exemplary network environment having network entities operating on primary and secondary carriers at different locations in a system supporting carrier aggregation according to an exemplary embodiment of the present invention.

FIG. 5 is a diagram illustrating an exemplary network environment having network entities operating on primary and secondary carriers at different locations in a system according to an exemplary embodiment of the present invention supporting carrier aggregation.

Referring to FIG. 5, the Remote Radio Heads (RRHs) 503 operating on frequency band F2 507 are around the macro eNB 501 using frequency band F1 505. If the UE is connected to both the macro eNB and RRH and located near the RRH and if the UE transmits signal via the RRH, the signal may reach the RRH at an appropriate timing even when there is a little delay due to the short distance. However, the signal transmitted to the macro eNB does not reach the macro eNB at appropriate timing due to the long distance. In order to address this issue, the UE operating with aggregated carriers should synchronize multiple uplink transmission timings. There is therefore a need for a method of operating TATs efficiently in association with multiple uplink transmission timings.

According to an exemplary embodiment of the present invention, the eNB categorizes the carriers having uplink timings identical or similar among each other into groups to facilitate management. This technique is referred to as Timing Advance Group (TAG).

In an exemplary case that one Primary Cell (PCell) (or first cell) and three Secondary Cells (SCells) A, B and C (or second cells) are aggregated, if the PCell and the SCell A have similar uplink timings, they may be categorized into group 1 while the SCell B and SCell C are categorized into group 2. In this case, the eNB transmits the TA information to the group 1 in the TAC MAC CE or RAR to command uplink timing adjustment such that the UE adjusts uplink timings of both the PCell and SCell A based on the information carried in the TAC MAC CE. Upon receipt of the TA information, the UE starts a TAT for the group 1. The TAT is the timer for verifying the validity of the TA information. The uplink data may be transmitted through the carriers (i.e., a PCell and SCell A) belonging to the group 1 before the TAT of the group 1 expires. If the TAT expires, it is regarded that the TA information is no longer valid such that the UE cannot transmit data on the corresponding carriers before receiving new TA information from the eNB.

The TAT of the group including the PCell such as group 1 in the above example, i.e., the TAT of PCell TAG, is referred to as PTAG TAT. The TAT of the group including no PCell is referred to as STAG TAT.

Figure 6:
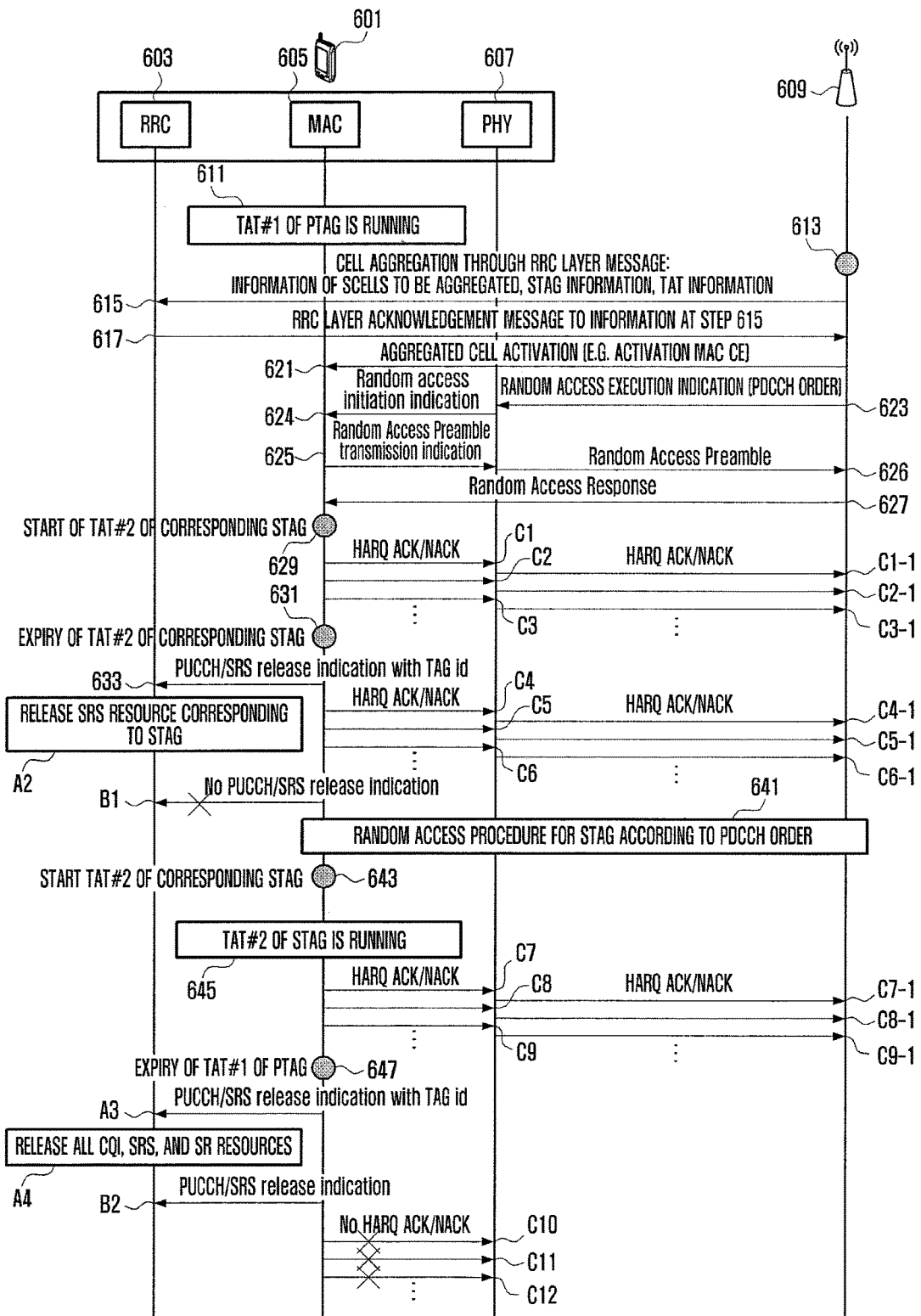
FIG. 6 is a signaling diagram illustrating signal flows between an evolved Node B (eNB) and User Equipment (UE) in a method according to an exemplary embodiment of the present invention.

FIG. 6 is a signaling diagram illustrating signal flows between an eNB and a UE in a method according to an exemplary embodiment of the present invention.

Referring to FIG. 6, the UE 601 is connected to the eNB 609 through only the PCell with the TAT of the PTAG, i.e. TAT#1, at step 611.

The eNB 609 instructs the UE to configure carrier aggregation under the assumption that the UE 601 supports the carrier aggregation at step 613. The eNB configures carrier aggregation with the UE, PTAG TAT for a plurality of carriers, information on the SCells to be aggregated, and TAT value per TAG through RRC layer message 603 so as to configure the PTAG TAT on the plural carriers and set one or more STAG TATs to different values at step 615.

The TATs of the respective TAG may be set to the same value or different values. The RRC layer message may be the RRC CONNECTION RECONFIGURATION (RRCConnectionReconfiguration) message. The RRC layer entity of the UE which has received the RRC layer message transmits an acknowledgement message at step 617. The acknowledgement message may be the RRC CONNECTION RECONFIGURATION Complete (RRCConnectionReconfigurationComplete) message.

In order to use a SCell, the eNB transmits an activation/deactivation control message (activation/deactivation MAC CE message to the UE on the MAC layer 605 to notify the UE of the activation/deactivation of the SCell at step 621. In a case of the PCell, the UE is in the connected state to the eNB such that step 621 may be omitted. In a case where the SCells do not belong to the PTAG even though they have received the Activation/deactivation MAC CE to be activated (i.e., the SCells belonging to an STAG), if the uplink synchronization is not acquired as described with reference to FIG. 4 (or TAT is not running), there is a need for a process of uplink timing synchronization. For this purpose, the eNB transmits a command (i.e., PDCCH order) to request the UE to transmit a random access preamble through a certain cell at step 623.

Upon receipt of the PDCCH order, the PHY layer 607 of the UE instructs the MAC layer 605 to start random access at step 624. The MAC layer of the UE instructs the PHY layer 607 to transmit Random Access Preamble at step 625, such that the PHY layer 607 of the UE transmits the Random Access Preamble to the eNB through a specific cell at step 626. If the random access preamble is received, the eNB determines the transmission timing adjustment amount according to the arrival timing of the preamble and then transmits a Random Access Response (RAR) carrying the TA information to the UE at step 627.

Upon receipt of the RAR, the UE starts the TAT of the corresponding STAG, i.e., TAT#2 in FIG. 6 at step 629. Accordingly, the HARQ ACK/NACK corresponding to the data transmitted through the SCells belonging to the STAG is delivered from the MAC layer 605 to the PHY layer 607 (C1, C2, and C3 in FIG. 6), and the PHY layer 607 transmits the HARQ ACK/NACK to the eNB (C1-1, C2-1, and C3-1 of FIG. 6).

Afterward, the STAG TAT (i.e., TAT#2) expires at a certain time at step 631. In this case, the UE may operate as follows.

The UE stops transmission of Uplink Shared Channel (UL-SCH) for the cells of TAG to which the corresponding SCell belongs. Since the TAT information used by the STAG is determined to be no longer valid, the UE stops uplink transmission through SCells belonging to the corresponding STAG.

The HARQ ACK/NACK corresponding to the data transmitted/received through the PCell or SCell is delivered to the PHY layer 607 (C4, C5, and C6 of FIG. 6), and the PHY layer 607 transmits the HARQ ACK/NACK to the eNB (C4-1, C5-1, and C6-1 of FIG. 6). Although the timing information of the TAG to which the SCell belongs is not valid, the HARQ ACK/NACK is still transmitted through Physical Uplink Control Channel (PUCCH) through the PCell.

Although not depicted in the drawing, since the HARQ ACK/NACK information is not delivered to the PHY layer, the following options may be considered for determination.

Option 1: The UE suspends delivering HARQ ACK/NACK information to the PHY layer only when PTAG TAT has expired (643).

Option 2: The UE suspends delivering HARQ ACK/NACK information to the PHY layer when all of the TATs have expired (645).

Option 3: The UE suspends delivering the HARQ ACK/NACK information to the PHY layer when the PTAG TAT has expired and no uplink data allocation information exist at the corresponding Transmission Time Interval (TTI) (647). This is because the HARQ ACK/NACK information may be transmitted in the uplink data region when the resource is allocated in the uplink data region.

Relevant to the delivery of PUCCH/Sounding Reference Signal (SRS) release information to the RRC layer, the PUCCH/SRS may be handled according to any of the exemplary embodiments described below.

Embodiment 1: The MAC layer 605 delivers PUSCH/SRS release indication with TAG ID (ID of STAG corresponding to TAT#2 in this embodiment) (633). Upon receipt of the PUSCH/SRS release information, the RRC layer releases the SRS resource for transmission through the SCell belonging to the corresponding STAG with the exception of the SRS of the PCell and SCell not belonging to the corresponding TAG (A2 in FIG. 6).

Embodiment 2: The MAC layer 605 suspends delivery of the PUCCH/SRS release indication (B1 in FIG. 6).

Embodiment 3: Although not depicted in the drawing, the PUCCH/SRS release indication is delivered to the RRC layer when all of the TATs including the STAG TAT (TAT#2) have expired.

Afterward, the eNB performs random access process triggered by the PDCCH order (see steps 623, 625, and 627) at step 641 and restarts the TAT#2 at step 643.

While the TAT#2 corresponding to the STAG is running at step 645, the MAC layer 605 delivers the generated HARQ ACK/NACK to the PHY layer 607 (C7, C8, and C9 of FIG. 6) in the same manner as C1, C2, and C3 of FIG. 6, and the PHY layer 607 transmits the HARQ ACK/NACK to the eNB (C7-1, C8-1, and C901 of FIG. 6).

Afterward, the TAT#1 as TAT of the PTAG expires at step 647. At this time, the UE performs operations as follows.

The UE suspends uplink transmission through the cells of the TAG to which the PCell belongs. The transmission is suspended because the timing information of the TAG to which the PCell belongs is determined to be no longer valid.

The UE discards all the data in the HARQ buffer (i.e., flushes the buffer).

The UE stops delivery of the HARQ ACK/NACK to the PHY layer 607 (see embodiment 1, and following embodiments 2 and 3) (C10, C11, and C12).

The HARQ ACK/NACK corresponding to downlink data is transmitted through PDCCH and this is in the meaning of the suspension of the uplink transmission through the PCell since the PUCCH is always transmitted through the PCell.

Although not depicted in the drawing, the information may be delivered to the PHY layer 607; this may be determined in consideration of the following options.

Embodiment 2: The UE suspends delivery of the HARQ ACK/NACK information to the PHY layer 607 when all the TATs including PTAG TAT have expired.

Embodiment 3: The UE suspends delivery of the HARQ ACK/NACK information to the PHY layer 607 when the PTAG TAT has expired and there is on uplink data allocation information at the corresponding TTI (647). This is because the HARQ ACK/NACK may be transmitted in the uplink data region of the SCell belonging to the STAG when the resource is located in the uplink data region.

The UE suspends PUCCH transmission; suspends SRS transmission through the cells of the TAG to which the PCell belongs with the exception of the SRS transmission through the SCell not belonging to the corresponding TAG (see following embodiment 2); or suspends all of the SRS transmissions (see following embodiment 1).

The PUCCH transmission through PCell is suspended, and since the SRS is configured per cell, only the PUCCH of the PCell and SRS configured for the PTAG are suspended while others are maintained.

The following options may be considered for transmitting the suspension information.

Embodiment 1: The entire PUCCH/SRS release indication is delivered to the RRC layer (B2 in FIG. 6). Upon receipt of the PUCCH/SRS release information, the RRC layer releases the resources allocated for Channel Quality Indicators (CQI), SRS, and Service Request (SR) of all the cells.

Embodiment 2: The PUCCH/SRS release indication with the TAG IDs of respective TAGs is delivered to the RRC layer (A3 of FIG. 6). Upon receipt of the PUCCH/SRS release indication, the RRC layer release the resources allocated for CQI, SRS, and SR of the cell belonging to the PTAG (A4 of FIG. 6).

Embodiment 3: The UE delivers the PUCCH/SRS release indication to the RRC layer when all of the TATs including the TATs of PTAG expire.

Although various exemplary embodiments related to the HARQ ACK/NACK information and PUCCH/SRS release indication delivery have been proposed, these exemplary embodiments related to delivery of the PUCCH/SRS release indication and HARQ ACK/NACK information operate separately with the possibility of available combinations (i.e., all available combinations of the embodiments associated with the PTAG and STAG. For example, the HARQ ACK/NACK-related embodiments 1, 2, and 3 and PUCCH/SRS release-related embodiments 1, 2, and 3 may be implemented in every combination and are not limited to the combinations described above).

Figure 7:
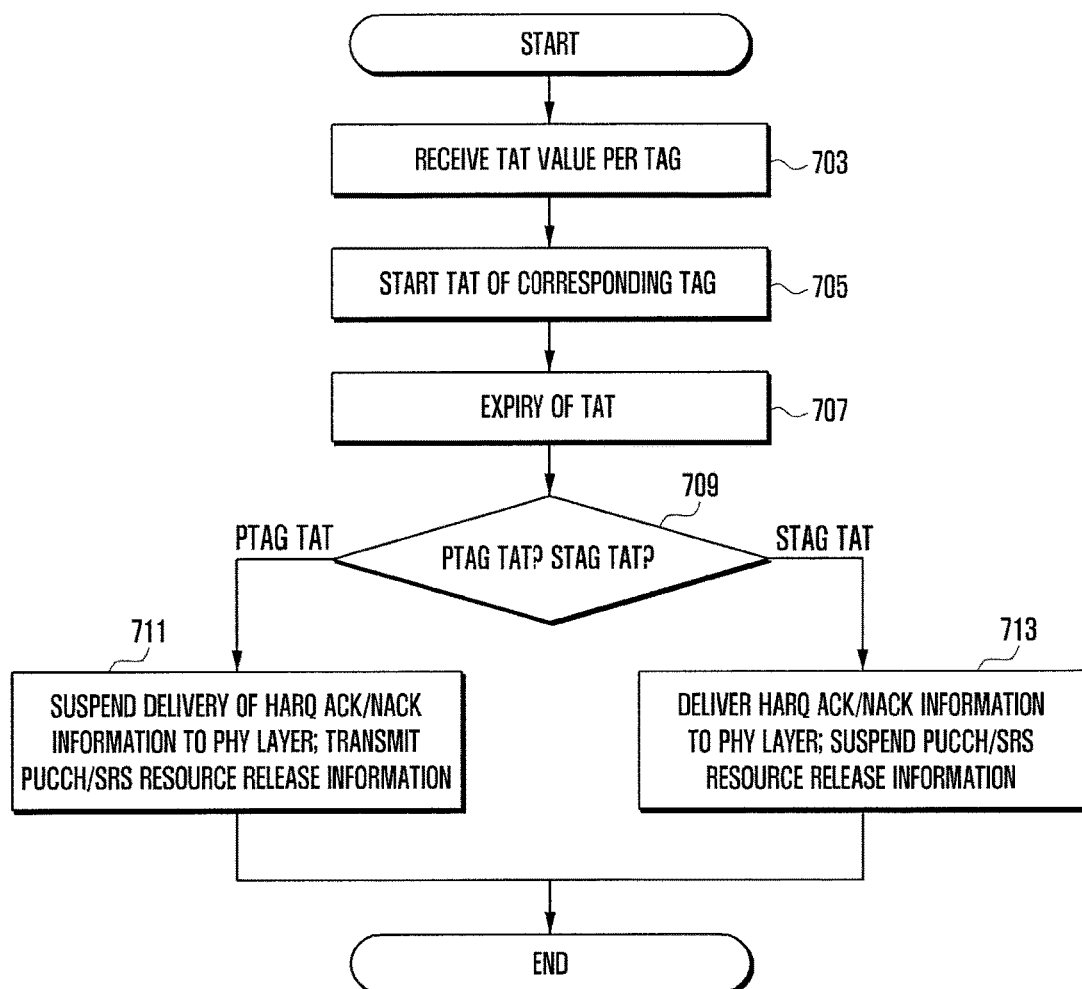
FIG. 7 is a flowchart illustrating a UE procedure of a method according to a first exemplary embodiment of the present invention.

FIG. 7 is a flowchart illustrating a UE procedure of a method according to a first exemplary embodiment of the present invention.

Referring to FIG. 7, the UE receives an RRC message carrying the carrier configuration for aggregation, TAG configuration, and TAT values of the respective TAGs from the eNB at step 703.

If an RAR is received through a certain SCell activated by the eNB (the PCell activation is not necessary in PCell) or if a TAC MAC CE is received but the TAT of the TAG to which the corresponding SCell belongs is not running, the UE starts (executes) the TAT at step 705. If it is determined that the TAT of the corresponding TAG is running, the UE restarts (re-executes) the TAT. If the TAT expires at step 707, the UE determines whether the TAT is the PTAG TAT or STAG TAT at step 709.

In embodiment 1 of the present invention, if the TAT is the PTAG TAT, the UE spends uplink data transmission in the PTAG and delivery of the HARQ ACK/NACK information to the PHY layer 607, delivers the PUCCH/SRS release indication to the RRC layer, and discards the packets in the UE's HARQ buffer at step 711.

If the TAT is the STAG TAT, the UE suspends the uplink data transmission through the cell belonging to the corresponding STAG but maintains the delivery of the HARQ ACK/NACK information to the PHY layer 607 even when the TAT expires, and suspends the delivery of the PUCCH/SRS release indication to the RRC layer at step 713.

Figure 8:
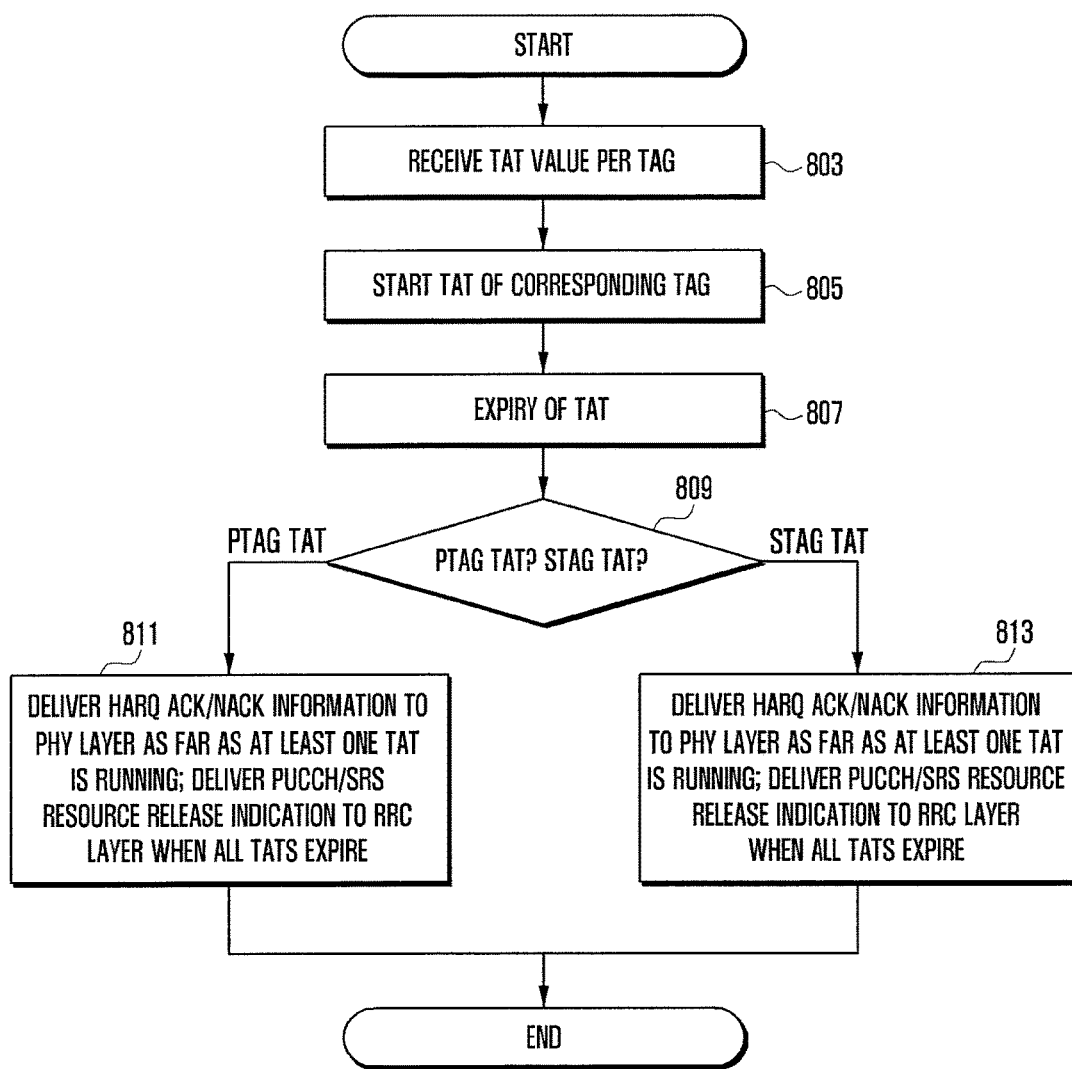
FIG. 8 is a flowchart illustrating a UE procedure of a method according to a second exemplary embodiment of the present invention.

FIG. 8 is a flowchart illustrating a UE procedure of a method according to a second exemplary embodiment of the present invention.

Referring to FIG. 8, the UE receives an RRC message carrying the carrier configuration for aggregation, TAG configuration, and TAT values of the respective TAGs from the eNB at step 803. If an RAR is received through a certain SCell activated by the eNB (the PCell activation is not necessary in PCell) or if a TAC MAC CE is received but the TAT of the TAG to which the corresponding SCell belongs is not running, the UE starts (executes) the TAT at step 805. If it is determined that the TAT of the corresponding TAG is running, the UE restarts (re-executes) the TAT. When the TAT expires at step 807, the UE determines whether the TAT is the PTAG TAT or STAG TAT at step 809.

In embodiment 2-1 of the present invention, regardless of whether the TAT is PTAG TAT or STAG TAT, the UE suspends uplink data transmission through the cell belonging to the corresponding TAG, maintains delivery of the HARQ ACK/NACK information as long as at least one TAT is running, and, when all of the TATs expire, delivers the PUCCH/SRS resource release indication to the RRC layer at steps 811 and 813.

In embodiment 2-2 of the present invention, if the TAT is the PTAG TAT, the UE maintains delivery of the HARQ ACK/NACK information to the physical layer until all of the TATs expire and, when all of the TATs expire, delivers the PUCCH/SRS release indication to the RRC at step 811. However, if the TAT is the STAG TAT, the UE sends the eNB an RRC message to notify the TAT expiration or an RRC message with TAG ID to stop SRS transmission through the cell of the corresponding TAG at step 813.

Figure 9:
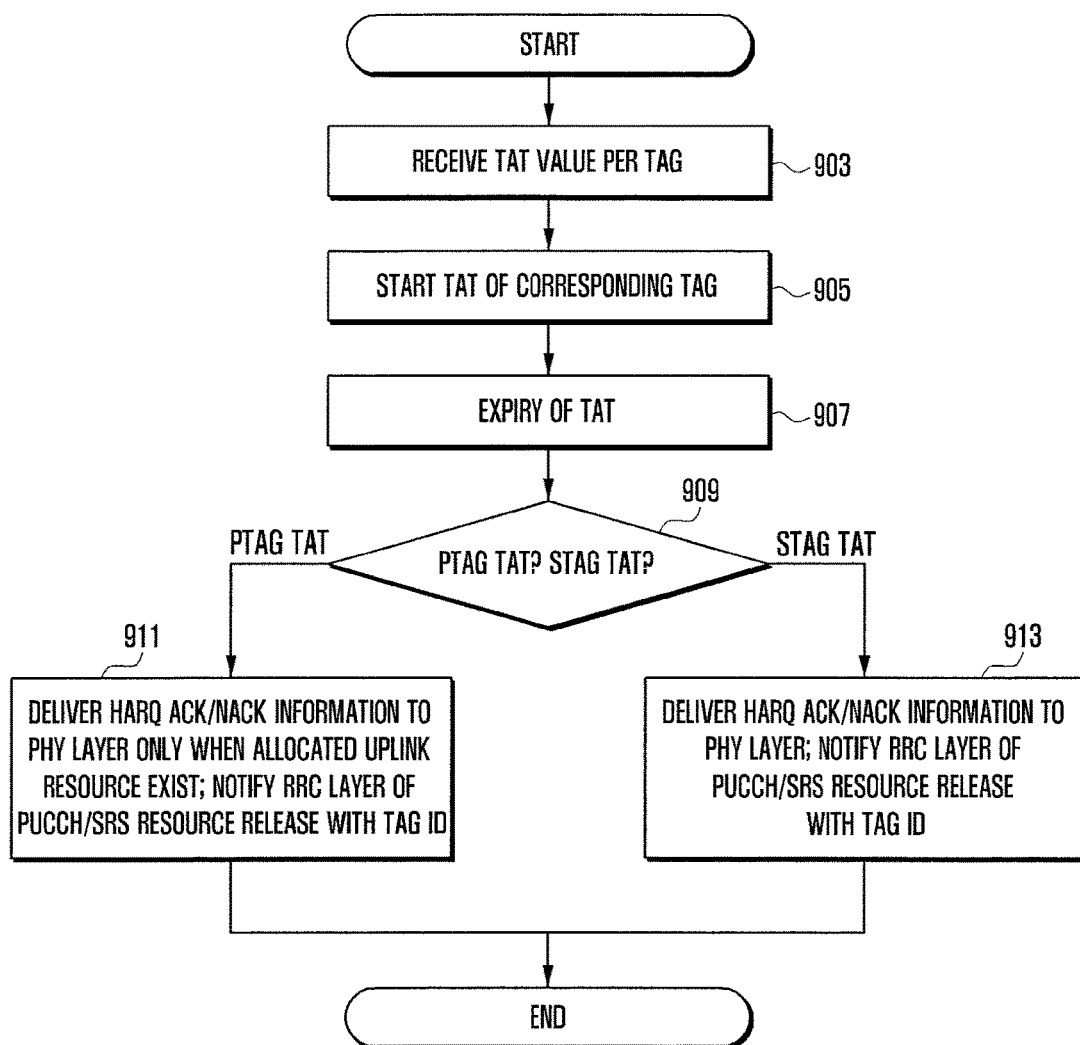
FIG. 9 is a flowchart illustrating a UE procedure of a method according to a third exemplary embodiment of the present invention.

FIG. 9 is a flowchart illustrating a UE procedure of the method according to a third exemplary embodiment of the present invention.

Referring to FIG. 9, the UE receives an RRC message carrying the carrier configuration for aggregation, TAG configuration, and TAT values of the respective TAGs from the eNB at step 903. If an RAR is received through a certain SCell activated by the eNB (the PCell activation is not necessary in PCell) or if a TAC MAC CE is received but the TAT of the TAG to which the corresponding SCell belongs is not running, the UE starts (executes) the TAT at step 905. If it is determined that the TAT of the corresponding TAG is running, the UE restarts (re-executes) the TAT. When the TAT expires at step 907, the UE determines whether the TAT is the PTAG TAT or STAG TAT at step 909.

In embodiment 3 of the present invention, if the TAT is PTAG TAT, the UE suspends uplink data transmission in the corresponding TAG, delivers the HARQ ACK/NACK information to the PHY layer 607 only when the uplink resource is allocated in other TAG of which a TAT is running, delivers the PUCCH/SRS release indication with the TAG ID to the RRC layer per TAG, and discards the data buffered in all of the HARQ buffers at step 911. Upon receipt of the information, the RRC layer stops transmission of SR, CQI, and SRS on the PUCCH. If the TAT is the STAG TAT, the UE maintains the delivery of the HARQ ACK/NACK information to the PHY layer after the expiration of the TAT and delivers the SRS release indication with TAG ID to the RRC layer per TAG such that the RRC layer stops SRS transmission through the cell belonging to the corresponding STAG at step 913.

Figure 10:
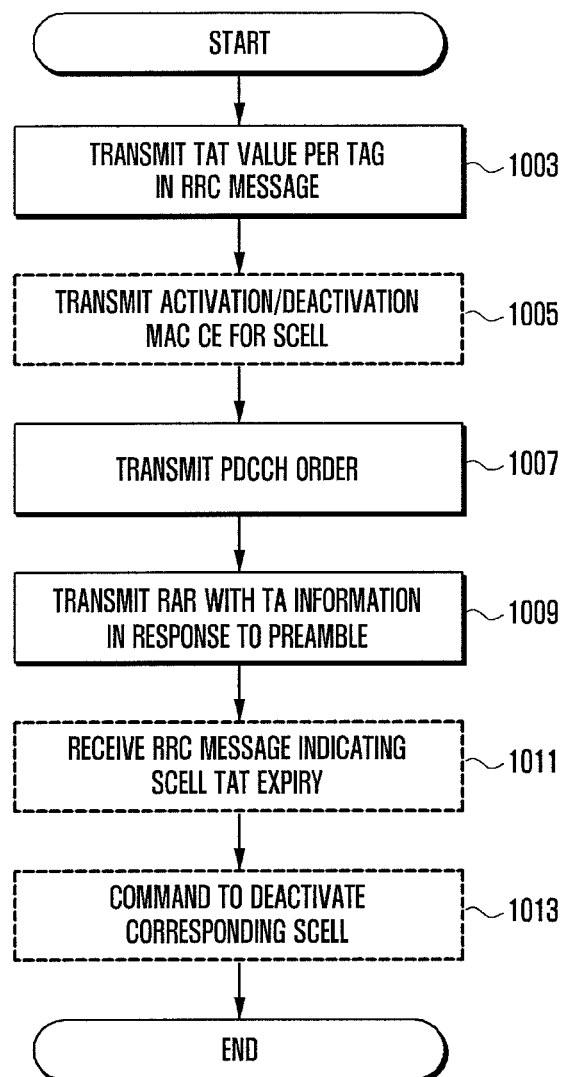
FIG. 10 is a flowchart illustrating an eNB procedure of a method according to an exemplary embodiment of the present invention.

FIG. 10 is a flowchart illustrating an eNB procedure of a method according to an exemplary embodiment of the present invention.

Referring to FIG. 10, the eNB transmits an RRC message carrying the carrier configuration for carrier aggregation, tag configuration, and TAT values of respective TAGs at step 1003. The TAT values may be different from each other or be identical with each other.

In order to activate a certain SCell, the eNB transmits an Activation/Deactivation MAC CE to the UE at step 1005. Step 1005 is not necessary for the PCell.

The eNB transmits a PDCCH order to the UE to request for the transmission of preamble through a certain SCell at step 1007. If a preamble is received from the UE, the eNB analyzes the reception timing to transmit an RAR message including the timing adjustment information at step 1009.

When the STAG TAT expiration is notified to the eNB as shown in the embodiment 2-2 of FIG. 8, the eNB receives the RRC message informing of the STAG TAT expiration from the UE at step 1011.

The eNB may perform the procedure for deactivating the corresponding SCell or releases the resource allocated to the SCell by transmitting an RRC message at step 1013.

Figure 11:
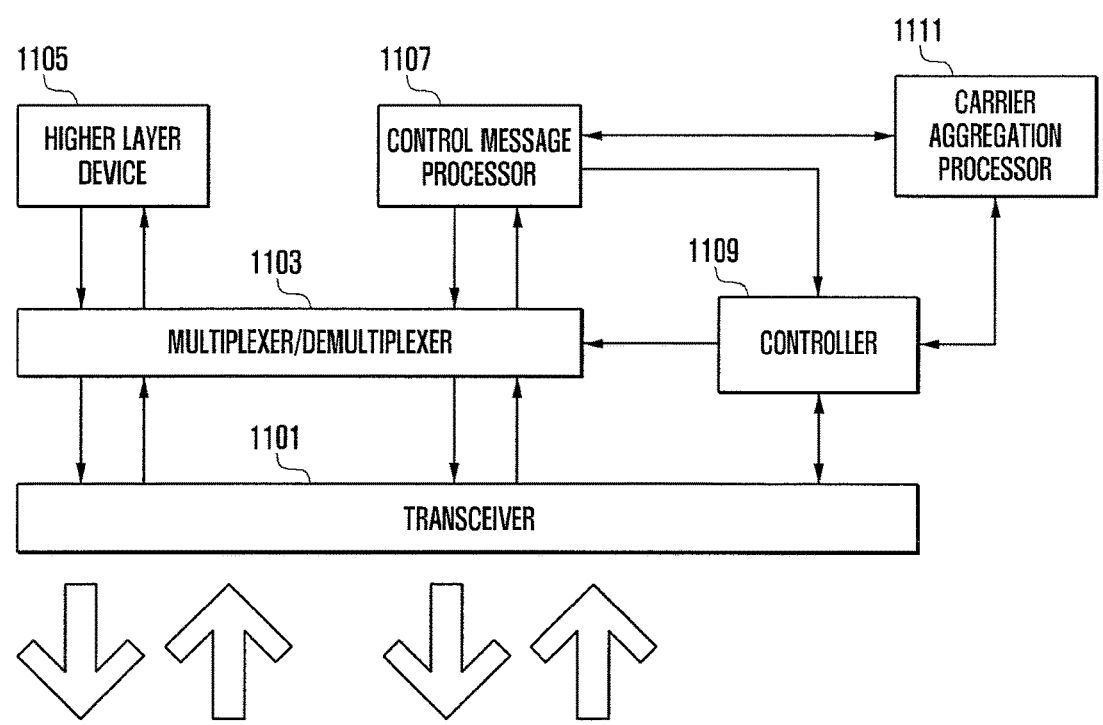
FIG. 11 is a block diagram illustrating a configuration of a UE according to an exemplary embodiment of the present invention.

FIG. 11 is a block diagram illustrating a configuration of the UE according to an exemplary embodiment of the present invention.

Referring to FIG. 11, the UE transmits/receives data generated by a higher layer device 1105 and control messages generated by a control message processor 1107. When transmitting control signal and/or data to the eNB, the UE multiplexes the control signal and/or data via the multiplexer/demultiplexer 1103 under the control of the controller 1109. When receiving control signal and/or data from the eNB, the UE receives the physical signal via the transceiver 1101, demultiplexes the received signal via the multiplexer/demultiplexer 1103, and delivers the demultiplexed signal to the corresponding higher layer device 1105 or control message processor 1107.

When the TAC MAC CE is received, the control message processor 1107 notifies the carrier aggregation processor 1111 of the TAC MAC CE to start (restart) the TAT of the corresponding TAG. If the TAT of the corresponding TAG expires, the UE determines whether the expired TAT is PTAG TAT or STAG TAT and then commands the controller 1109 to execute the operations as described with reference to FIG. 5.

Although the description is directed to the case where the function blocks constituting the UE are responsible to the respective functions, exemplary embodiments of the present invention are not limited thereto. For example, the functions of the control message processor 1107 may be performed by the controller 1109.

In this case, the controller 1109 starts the first TAT for the first group including the first cell and, when the TA information on the second group not including the first cell is received, starts the second TAT. The controller 1109 determines transmission of at least one of HARQ ACK/NACK message, physical uplink control channel, and sounding reference signal according to the operation or expiration of the first or second TAT.

According to an exemplary embodiment of the present invention, the controller 1109 may control transmission of the HARQ ACK/NACK corresponding to the data transmitted through the second cells belonging to the second group to the eNB when the second TAT starts.

According to an exemplary embodiment of the present invention, the controller 1109 may also control to stop transmission of the uplink shared channel through the second cells belonging to the second group when the second TAT expires.

According to an exemplary embodiment of the present invention, the controller 1019 may control to stop transmission of the uplink shared channel through the second cells belonging to the second group when the second TAT expires.

According to an exemplary embodiment of the present invention, the controller 1109 may control to transmit a message for suspending transmission of at least one of the physical uplink control channel with ID of the second group and sounding reference signal.

According to an exemplary embodiment of the present invention, the controller 1109 may control to suspend the transmission of at least one of the uplink control channel with the ID of the second group and sounding reference signal when the second TAT expires.

According to an exemplary embodiment of the present invention, the controller 1109 may control to suspend uplink transmission through the cells belonging to the first group when the first TAT expires.

According to an exemplary embodiment of the present invention, the controller 1109 may control to discard the data buffered in the HARQ buffer when the first TAT expires.

According to an exemplary embodiment of the present invention, the controller 1109 may control to suspend the transmission of the HARQ ACK/NACK when the first TAT expires.

According to an exemplary embodiment of the present invention, the controller 1109 may control to suspend the transmission of the physical uplink control channel when the first TAT expires.

Figure 12:
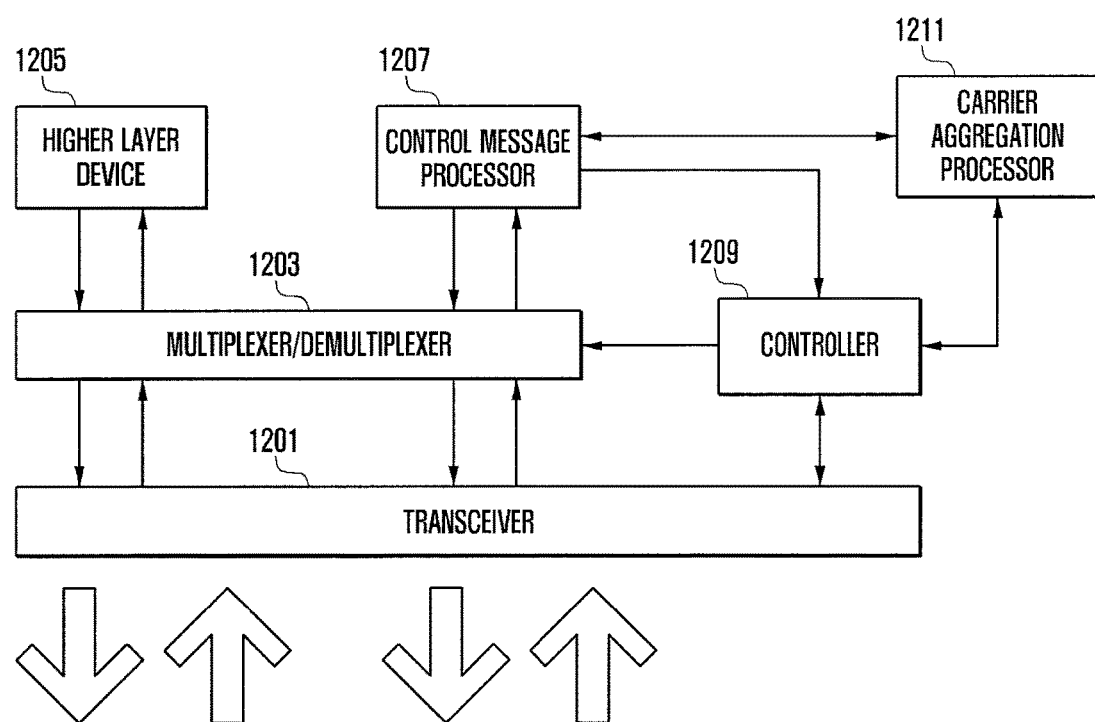
FIG. 12 is a block diagram illustrating a configuration of an eNB according to an exemplary embodiment of the present invention.

FIG. 12 is a block diagram illustrating a configuration of an eNB according to an exemplary embodiment of the present invention.

Referring to FIG. 12, the eNB transmits/receives data generated by a higher layer device 1205 and control messages generated by a control message generator 1207. In transmission mode, the data is multiplexed by the multiplexer/demultiplexer 1203 and then transmitted through the transceiver 1201 under the control of the controller 1209. In reception mode, the physical signal is received by the transceiver 1201, demultiplexed by the multiplexer/demultiplexer 1203, and then delivered to the higher layer device 1205 or the control message processor 1207 according to the message information under the control of the controller 1209.

The carrier aggregation processor 1211 configures the carrier aggregation and TAT value per TAG for a certain UE. The control message processor 1207 generates an RRC message for transmission to the UE. In case of activating a SCell for the corresponding UE, the eNB transmits a TAC MAC CE via the control message processor 1207, receives a preamble form the UE in response to the PDCCH order, and generates an RAR message including the timing adjustment information to the UE.

In case of transmitting the RRC message when the STAG TAT for a certain UE expires as described with reference to FIG. 8, the eNB receives the RRC message via the control message processor 1207, determines whether the carrier aggregation processor 1211 should perform addition operation (e.g., deactivation of the SCells belonging to the corresponding TAG), and commands the corresponding UE to deactivate the SCells belonging to the corresponding TAG.

As described above, a method according to an exemplary embodiment of the present invention defines the detailed UE's operations with multiple uplink timings in the system supporting carrier aggregation so as to avoid malfunction of the system and improve operation reliability.

A method according to an exemplary embodiment of the present invention is capable of managing multiple uplink timings without error by defining the UE operations in detail in the system operating with a plurality of time alignment timers.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating time alignment timers (TATs) of a user equipment (UE) transmitting/receiving data to/from an evolved node B (eNB) on a primary cell (PCell) and at least one secondary cell (SCell), the method comprising:
    receiving, from the eNB, first timing advance (TA) information associated with a primary timing advance group (PTAG) which is a group of serving cells having a same uplink timing and includes the PCell;
    starting or restarting a first TAT associated with the PTAG based on the first TA information;
    receiving, from the eNB, second TA information associated with a secondary timing advance group (STAG) which is a group of serving cells having a same uplink timing and does not include the PCell;
    starting or restarting a second TAT associated with the STAG based on the second TA information;
    receiving downlink data on at least one serving cell in the STAG;
    identifying whether the first TAT associated with the PTAG is running and whether the second TAT associated with the STAG is running;
    delivering hybrid automatic repeat request (HARQ) positive or negative acknowledgement (ACK/NACK) information corresponding to the downlink data received on the at least one serving cell in the STAG to a physical (PHY) layer of the UE, in case that the second TAT associated with the STAG expires and the first TAT associated with the PTAG is running; and
    flushing all HARQ buffers for all serving cells in the PTAG and the STAG, in case that the first TAT associated with the PTAG expires and the second TAT associated with the STAG is running or expires.

2. The method of claim 1, wherein the first TA information and the second TA information is received in a timing advance command media access control (MAC) control element or in a random access response message.

3. The method of claim 2, wherein the random access response message is transmitted from the eNB, in response to a transmission of random access preamble by the UE according to a physical downlink control channel (PDCCH) order from the eNB.

4. The method of claim 1, further comprising:
    notifying a radio resource control (RRC) to release a sounding reference signal (SRS) for serving cells belonging to the STAG, in case that the second TAT associated with the STAG expires and the first TAT associated with the PTAG is running.

5. The method of claim 1, further comprising:
    suspending delivery of HARQ ACK/NACK information to the PHY layer, in case that the first TAT associated with the PTAG expires.

6. The method of claim 1, further comprising:
    suspending delivery of HARQ ACK/NACK information to the PHY layer, in case that the first TAT associated with the PTAG expires and the second TAT associated with the STAG expires.

7. The method of claim 4, wherein the notifying of the RRC to release the SRS comprises delivering an identifier (ID) of the STAG.

8. The method of claim 1, further comprising:
    transmitting a HARQ ACK/NACK, corresponding to data received on the at least one serving cell in the STAG, to the eNB through the PCell, in case that the second TAT associated with the STAG expires and the first TAT associated with the PTAG is running.

9. The method of claim 1, further comprising:
    suspending uplink data transmission, in case that the first TAT associated with the PTAG expires.

10. The method of claim 1, further comprising:
    notifying a radio resource control (RRC) to release a physical uplink control channel (PUCCH)/a sounding reference signal (SRS) for all serving cells, in case that the first TAT associated with the PTAG expires.

11. A user equipment (UE) operating time alignment timers (TATs), the UE comprising:
    a transceiver; and
    a controller configured to:
        control the transceiver to receive, from an evolved node B (eNB), first timing advance (TA) information associated with a primary timing advance group (PTAG) which is a group of serving cells having a same uplink timing and includes a primary cell (PCell),
        start or restart a first TAT associated with the PTAG based on the first TA information,
        control the transceiver to receive, from the eNB, second TA information associated with a secondary timing advance group (STAG) which is a group of serving cells having a same uplink timing and does not include the PCell,
        start or restart a second TAT associated with the STAG based on the second TA information,
        control the transceiver to receive downlink data on at least one serving cell in the STAG, identify whether the first TAT associated with the PTAG is running and whether the second TAT associated with the STAG is running, deliver hybrid automatic repeat request (HARQ) positive or negative acknowledgement (ACK/NACK) information corresponding to the downlink data received on the at least one serving cell in the STAG to a physical (PHY) layer of the UE, in case that the second TAT associated with the STAG expires and the first TAT associated with the PTAG is running, and flush all HARQ buffers for all serving cells, in case that the first TAT associated with the PTAG expires and the second TAT associated with the STAG is running or expires.

12. The UE of claim 11, wherein the controller is further configured to control the transceiver to receive the first TA information and the second TA information in a timing advance command media access control (MAC) control element or in a random access response message.

13. The UE of claim 12, wherein the random access response message is transmitted from the eNB, in response to a transmission of a random access preamble by the UE according to a physical downlink control channel (PDCCH) order from the eNB.

14. The UE of claim 11, wherein the controller is further configured to notify a radio resource control (RRC) to release a sounding reference signal (SRS) for serving cells belonging to the STAG, in case that the second TAT associated with the STAG expires and the first TAT associated with the PTAG is running.

15. The UE of claim 11, wherein the controller is further configured to suspend delivery of HARQ ACK/NACK information to the PHY layer, in case that the first TAT associated with the PTAG expires.

16. The UE of claim 11, wherein the controller is further configured to suspend delivery of HARQ ACK/NACK information to the PHY layer, in case that the first TAT associated with the PTAG expires and the second TAT associated with the STAG expires.

17. The UE of claim 14, wherein the notifying of the RRC to release the SRS comprises delivering an identifier (ID) of the STAG.

18. The UE of claim 11, wherein the controller is further configured to control the transceiver to transmit a HARQ ACK/NACK, corresponding to data received on the at least one serving cell in the STAG, to the eNB through the PCell, in case that the second TAT associated with the STAG expires and the first TAT associated with the PTAG is running.

19. The UE of claim 11, wherein the controller is further configured to suspend uplink data transmission, in case that the first TAT associated with the PTAG expires.

20. The UE of claim 11, wherein the controller is further configured to notify a radio resource control (RRC) to release a physical uplink control channel (PUCCH)/a sounding reference signal (SRS) for all serving cells, in case that the first TAT associated with the PTAG expires.

* * * * *